(Model.)
G. S. BRIGGS.
WHEEL HUB.
No. 317,494. Patented May 12, 1885.
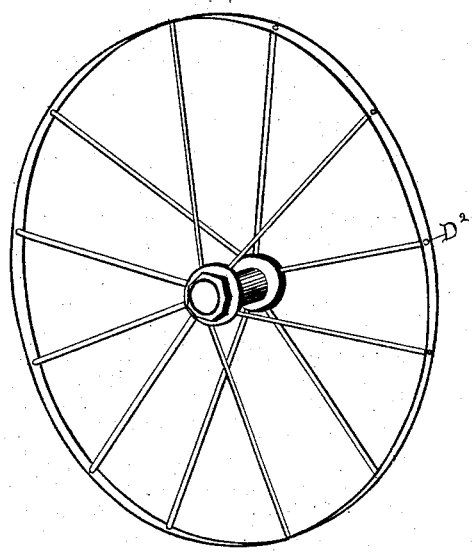
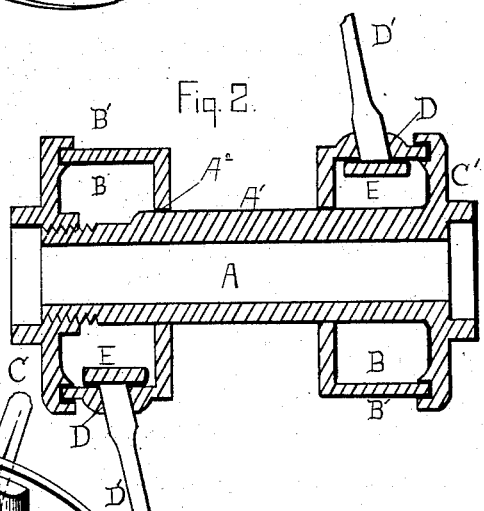
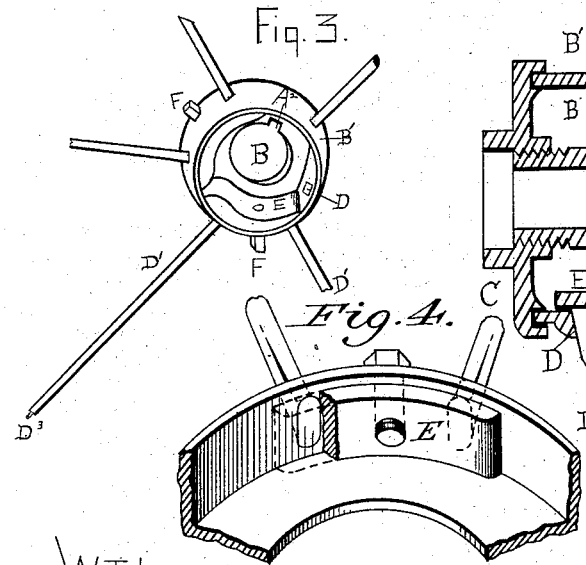
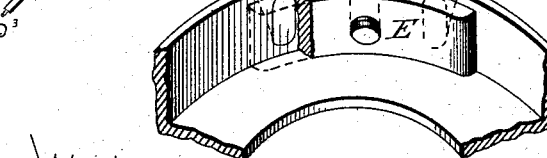
WITNESSES:
H. A. Stoddard
G. A. Winans
INVENTOR:
George S. Briggs,
PER
L. L. Morrison,
Attorney.
N. PETERS, Photo-Lithographer, Washington, D. C.

UNITED STATES PATENT OFFICE.

GEORGE S. BRIGGS, OF ROCKFORD, ILLINOIS.

WHEEL-HUB.

SPECIFICATION forming part of Letters Patent No. 317,494, dated May 12, 1885.

Application filed September 27, 1884. (Model.)

*To all whom it may concern:*

Be it known that I, GEORGE S. BRIGGS, of Rockford, in the county of Winnebago and State of Illinois, have invented certain Improvements in Wheel-Hubs; and I do hereby declare that the following is a full, clear, and exact description of the same.

The design of this invention is to furnish a light, cheap, strong hub, so constructed that the spokes thereof may be readily inserted therein, removed therefrom, and lengthened or shortened at pleasure, thereby rendering the repair and adjustment of the parts of a wheel easy.

In the accompanying drawings, which form a part of this specification, Figure 1 represents a wheel furnished with my improved hub. Fig. 2 represents a vertical, central, transverse section of the hub of Fig. 1. Figs. 3 and 4 represent in detail parts of Figs. 1 and 2.

A represents an axle-box combined with the disk C'.

A' represents a longitudinal rib which prevents B B from revolving upon A.

$A^2$ represents slots to receive the rib A'.

B B represent hub-sections. C represents a combined nut and disk.

D represents peripheral mortises cut through the annular flanges B' B' of B.

D' represents spokes inserted through the mortises D.

E represents spoke-regulators for regulating the spokes D'.

F represents set-screws for tightening and loosening the spoke-regulators E.

The spokes D' have their outer ends tenoned, and their inner ends, which should be, preferably, rectangular or polygonal in form, enlarged a little. The rim of the wheel should have peripheral mortises $D^2$, to receive the tenons $D^3$ on the outer ends of the spokes D'.

I prefer metal for all the above-mentioned parts.

To construct a wheel embodying my improved hub, I insert the tenoned ends of the spokes D' through the mortises D of the annular flanges B' B', sliding the spokes along until their inner and enlarged ends are detained by the mortises D; place the convex surface of the spoke-regulators E against the bases of the spokes D', and turn the set-screws F in slightly; pass the axle-box A through the hub-sections B B, turning the larger circular opening of one of the latter towards C', which will close the same, so arranging the latter that their mortises D will constitute staggering mortises, and the spokes D' a double set of spokes; next, insert the tenons $D^3$ of the spokes D' into the mortises $D^2$ in the rim of the wheel; adjust the movable spokes D' by means of the set-screws F; turn the combined nut and disk C onto the free end of the axle-box A until the wheel is rendered sufficiently stable.

What I claim is—

1. The combination, with the hub-section B, having the annular flange B', the latter furnished with the mortises D, of the movable spokes D', the spoke-regulators E, and the set-screws F, substantially as described.

2. The combination, with the hub sections B B, having the annular flanges B' B', the latter furnished with the mortises D D, of the spoke-regulators E E, the set-screws F F, the combined axle-box and disk A C', and the combined nut and disk C, substantially as described.

GEO. S. BRIGGS.

Witnesses:
A. N. NICHOLDS,
L. L. MORRISON.